UNITED STATES PATENT OFFICE.

JACOB SCHMITZ AND GERHARD STALMANN, OF DUSSELDORF, GERMANY, ASSIGNORS TO THE FIRM OF DR. SCHMITZ U. CO. G. M. B. H., OF DUSSELDORF, GERMANY.

PROCESS FOR THE MANUFACTURE OF CAMPHOR.

989,651. Specification of Letters Patent. Patented Apr. 18, 1911.

No Drawing. Application filed February 28, 1908. Serial No. 418,326.

*To all whom it may concern:*

Be it known that we, JACOB SCHMITZ and GERHARD STALMANN, subjects of the King of Prussia, German Emperor, residing at 54 Himmelsgeisterstrasse, Dusseldorf, Kingdom of Prussia, German Empire, have jointly invented new and useful Improvements in Processes for the Manufacture of Camphor, of which the following is a specification.

The present invention refers to a process for manufacturing camphor from isoborneol or substances suitable for conversion into isoborneol, as borneol, esters of borneol, and esters of isoborneol.

The new process consists in heating the said substances to a temperature above 100 degrees centigrade in a medium of alkaline reaction with oxidizing substances. As oxidizing substances we may use for instance: peroxid of manganese, manganites, peroxid of lead, plumbates, permanganates, the oxids of copper, nickel, mercury, etc. If the oxidizing substance or the product, formed from it by the reduction process, is sufficiently basic to prevent a formation of camphene, which is easily formed from isoborneol, an addition of bases is not required. It is, however, generally preferable to add bases, even if without that addition the formation of camphene may be avoided, as is the case when using oxid of copper or oxid of nickel as the oxidizing substance. If peroxid of manganese is used as the oxidizing substance, the addition of bases, as for instance oxid of calcium, hydroxid of calcium, is necessary.

Examples.

1. 25 kilograms of isoborneol are heated during 10 hours with 25 kilograms of caustic soda and 50 kilograms of peroxid of manganese to a temperature of 250 degrees centigrade. The formed camphor is isolated by distillation with water steam.

The reaction which takes place may be represented by the following equation:

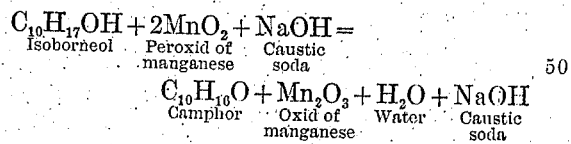

2. 25 kilograms of isoborneol are heated during 10 hours with 25 kilograms of water, 25 kilograms of caustic soda and 50 kilograms of peroxid of manganese to a temperature of 250 degrees centigrade. It is preferable to agitate the mixture during the process.

3. 25 kilograms of isoborneol are heated during 10 hours with 25 kilograms of water, 25 kilograms oxid of calcium and 50 kilograms of peroxid of lead to a temperature of 250 degrees centigrade.

4. 25 kilograms of isoborneol 25 kilograms of water, 25 kilograms of caustic soda, and 75 kilograms of oxid of copper are heated during 14 hours to a temperature of 250 degrees centigrade.

5. 25 kilograms of borneol, 25 kilograms of water, 50 kilograms of oxid of nickel and 25 kilograms of oxid of calcium are heated during 10 hours to a temperature of 250 degrees centigrade.

6. 25 kilograms of isoborneol, 25 kilograms of water, 100 kilograms of manganite of calcium and 25 kilograms of oxid of calcium are heated during 10 hours to a temperature of 250 degrees centigrade.

7. 25 kilograms of acetate of isoborneol, 35 kilograms of caustic soda, 50 kilograms of peroxid of manganese and 50 kilograms of water are heated to a temperature of 250 degrees centigrade.

The basic compounds, and the oxidizing means are chosen according to the actual cheapness.

We claim—

1. The process for manufacturing camphor which consists in heating isoborneol with oxids of the metals in a medium of basic reaction to temperatures above 100 degrees centigrade.

2. The process for manufacturing camphor, which consists in heating isoborneol with peroxids of the metals in a medium of alkaline reaction to temperatures above 100 degrees centigrade.

3. The process for manufacturing camphor, which consists in heating isoborneol with peroxids of the metals and hydrates of the alkali and alkaline-earth metals to temperatures above 100 degrees centigrade.

In testimony whereof we affixed our signatures in presence of two witnesses.

JACOB SCHMITZ.
GERHARD STALMANN.

Witnesses:
 PETER LIEBER,
 WILHELM FLASCHE.